Jan. 5, 1943.  A. ALFORD  2,307,184
ULTRA SHORT WAVE BEACON
Filed Oct. 19, 1939  2 Sheets-Sheet 2

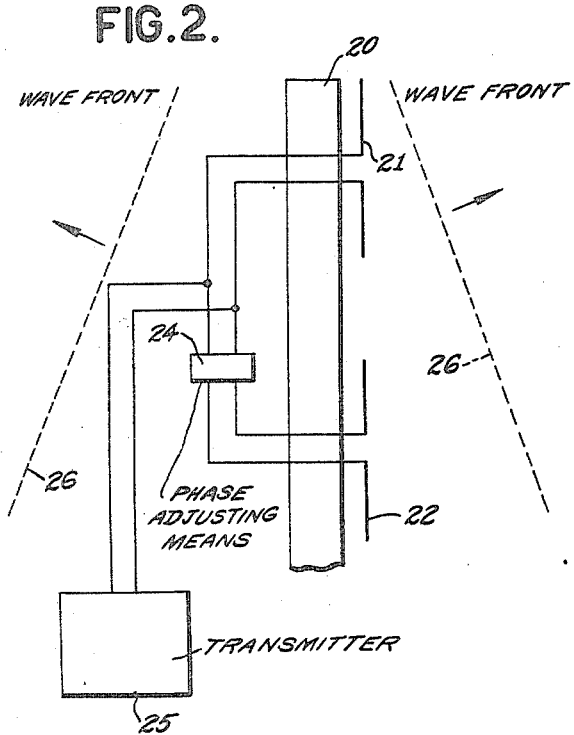
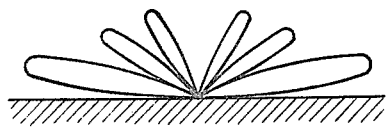
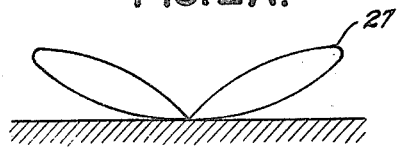
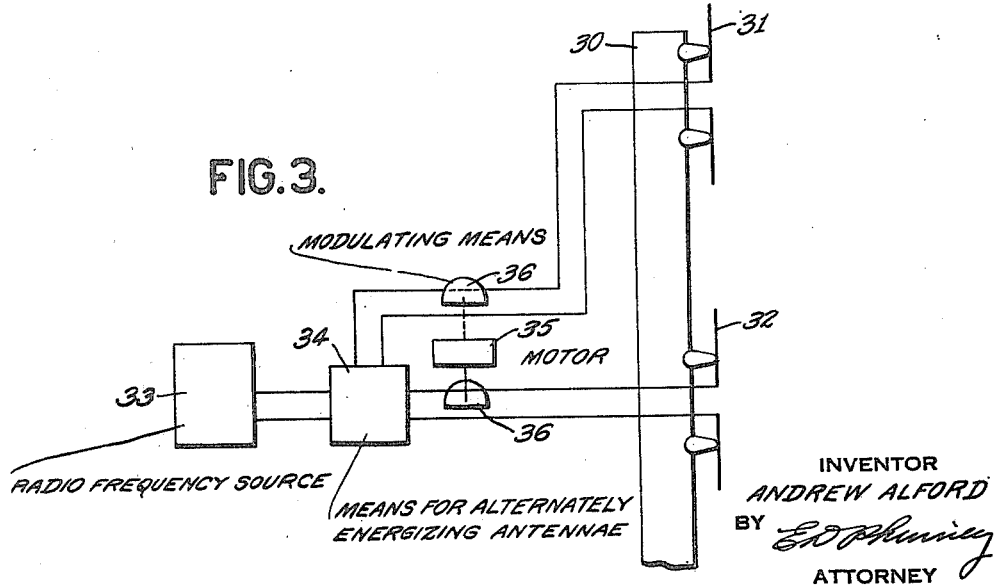

INVENTOR
ANDREW ALFORD
BY E. D. Phinney
ATTORNEY

Patented Jan. 5, 1943

2,307,184

UNITED STATES PATENT OFFICE 2,307,184

ULTRA SHORT WAVE BEACON

Andrew Alford, New York, N. Y., assignor to Federal Telephone and Radio Corporation, a corporation of Delaware Application October 19, 1939, Serial No. 300,166

3 Claims. (Cl. 250—11)

My invention relates to antenna systems and particularly to antenna arrangements for radio beacons.

When ultra short waves are used for guiding beacons, it is found that troublesome reflections may occur due to objects located near the earth's surface and for this reason it is desirable to mount the antennae at considerable heights above the ground. The mounting of the antennae at heights of from 60 to 125 feet in order to avoid reflections from objects near the ground, gives rise to the difficulty that because of interference pattern caused by ground reflections, the radiated pattern diagram is no longer a smooth curve but comprises a plurality of lobes with intervening null points. This characteristic of the radiation is objectionable for several reasons—first, airplane pilots at present are accustomed to find a cone of silence immediately above the beacon and nowhere else, and the additional regions of silence are therefore objectionable. Also, in regions near the null points in a pattern, the signals from the beacon are relatively weak so that the signals reflected from objects in the field of the beacon may be in the same order of magnitude as the direct beacon signal itself, so that apparent displacements of the course indication are caused.

In accordance with my invention the above-outlined difficulties and others are overcome by providing an antenna arrangement such as to avoid the apparent multiple lobe effect of the radiation pattern.

It is a principal object of my invention to provide an antenna array for producing a substantially smooth effective characteristic curve in the vertical plane.

It is a further object of my invention to provide an antenna system wherein the multiple lobes of the antenna radiation pattern are obviated by radiations transmitted in such a phase relationship as to tend to reduce the multiple lobe characteristic.

It is a further object of my invention to provide an antenna system for obviating the difficulties due to multiple lobes of radiation by alternately transmitting two radiation patterns, the maximum lobes of which do not coincide, to produce a substantially smooth effective pattern.

It is a still further object of my invention to provide radio beacons utilizing two or more antenna systems each of which is constructed so as to produce a substantially smooth radiation pattern in the vertical plane.

Figure 4:
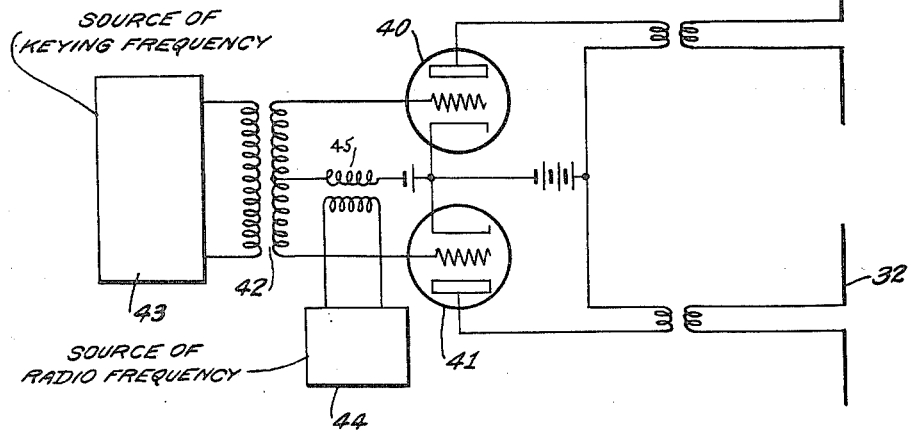
Figure 5:
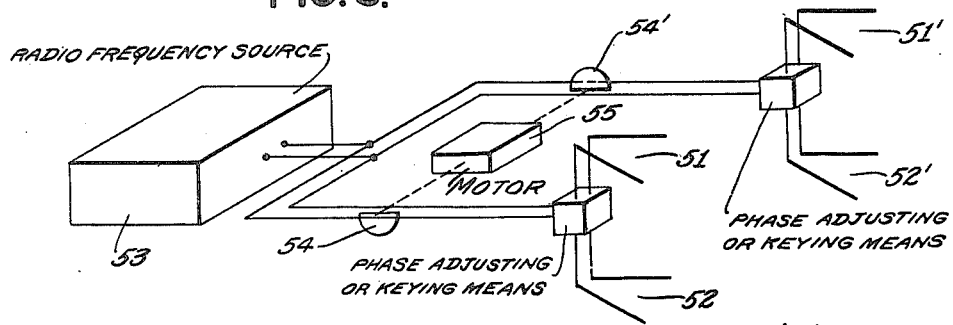
Figure 6:
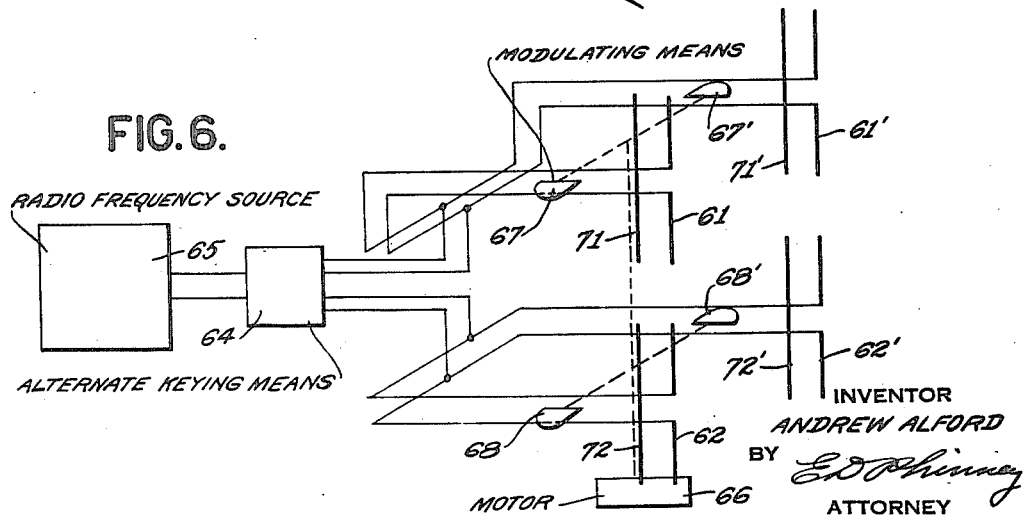

The above mentioned objects and advantages of my invention may be better understood from the particular description made with reference to the accompanying drawings, in which Fig. 1 illustrates the vertical field pattern characteristic which may be obtained from an antenna mounted at a relatively high distance above the earth's surface, Fig. 2 illustrates a form of antenna arrangement in accordance with my invention, Fig. 2A illustrates the field pattern obtained from the arrangement of Fig. 2, Fig. 3 illustrates another antenna arrangement in accordance with my invention, Fig. 3A illustrates field radiation pattern obtained by use of the antenna system of Fig. 3, Fig. 4 illustrates one form of keying arrangement for utilization with the antenna system in accordance with Fig. 3, Fig. 5 illustrates one form of radio beacon utilizing antenna arrangements in accordance with my invention, and Fig. 6 illustrates another beacon arrangement in accordance with my invention.

In radio beacon systems, particularly systems utilizing the ultra high frequencies, that is frequencies in the order of twenty megacycles or higher, the length of the wave is so small relative to objects on the earth's surface that troublesome reflections from these objects may occur. In order to avoid these troublesome reflections, it is desirable to mount the antenna at a considerable height above the ground. In fact, such ultra short wave antennae may be mounted at heights of from 60 to 125' above the ground or more. These ultra short wave antennae may, for example, be mounted on the top of existing tower structures utilized in the long wave system. Mounting of antennae at such a height, however, results in a radiation pattern in which there are a plurality of maxima and nulls, as illustrated in Fig. 1. This irregularity of radiation pattern is caused by the various reflections from the earth's surface causing interference patterns. It is desirable to produce a smooth radiation pattern not having a plurality of nulls in the various directions. Such a result might be achieved by providing a large conducting surface immediately below the antenna so the effect would be similar to mounting the antenna close to the earth's surface. However, when antennae are mounted on a high mast, it is difficult to provide any such reflecting surface. I have discovered that these troublesome effects may be largely eliminated by using a single antenna mounted above or below the radiating antennae and energized in suitable time phase displaced relationship. In Fig. 2 is illustrated such an arrangement.

In Fig. 2 is shown a mast 20 on which are mounted two vertical dipoles 21, 22. These dipoles are connected over conducting lines to a high frequency transmitting source 25. Antenna 21 is mounted at a desired height above the earth's surface and produces by itself a radiation pattern similar to that illustrated in Fig. 1. Immediately below antenna 21 is mounted antenna 22, arranged above the surface of the earth and energized in spaced phase relationship with respect to 21 to tend to cause neutralization of the waves from antenna 21 which travel downwardly. The resultant radiation of these two antennae then produces a radiation having a wave front such as shown at 26, inclined with respect to the earth's surface. The overall radiation pattern of the antenna system then produces a substantially smooth curve such as illustrated at 27 in Fig. 2A.

The antennae may be spaced apart an arbitrary distance which is convenient for mounting them and the phase may then be adjusted by means of a phase adjusting means 24, Fig. 2.

An alternative arrangement for obviating the difficulties outlined in connection with Fig. 1 is illustrated in Fig. 3. In this arrangement I provide antennae 31, 32 mounted on a mast 30 similar in appearance to that shown in Fig. 2. These antennae are fed from a common radio frequency source 33 over alternate keying means 34. Keying means 34 is arranged so as to increase the energization of one of the antennae 31, 32 at the same time the energization decreases in the other. This effect may be accomplished by a switching means which causes alternate energization of the antennae or by an arrangement which will permit relative change in energization of the antennae, since it is not necessary that one antenna be entirely deenergized at the time the other one is energized. The energy transmitted from the antenna is modulated by motor 35 driving the condenser plates 36 in the lines interconnecting the alternate energizing means and the separate antennae to alternately tune and detune the lines, or by other known means.

The radiation patterns produced by the two antennae may be adjusted by relative spacing above the earth so that the maxima of the lower antenna 32 coincide with the minima or nulls produced by antenna 31. This will then produce a radiation pattern such as shown in Fig. 3A. The radiation patterns produced by one of the antennae, for example, antenna 31, are indicated by the curves 37 shown in solid lines, and the patterns produced by antenna 32 are indicated by the curves 38 shown in broken lines. By adjusting the antennae vertically on the mast the maxima of 38 may be made to coincide with the nulls of 37. Since the antennae are alternately energized, the fields radiated thereby will not interfere with one another to produce a resultant uneven radiation pattern. Unless alternate energization is provided in this system, the resultant field pattern will be different from that shown in Fig. 1, but will still have a plurality of maxima and nulls due to the interaction of the two antennae themselves.

The alternate energization of the antennae may be at some high frequency well above the frequency range utilized for signaling so as not to cause any interference with the signals themselves.

One type of keying arrangement for the antenna system shown in Fig. 3 is illustrated in Fig. 4. As shown in Fig. 4, two vacuum tubes 40, 41, are provided, the grids of these tubes being coupled through a transformer 42 to a keying frequency source 43 in push-pull relation, so that when tube 40 is drawing maximum current, tube 41 is at a minimum. Energy from radio frequency signalling source 44 is applied over transformer 45 to tubes 40, 41, in parallel relation, and the anode circuits of tubes 40 and 41 are coupled to antennae 31, 32, respectively. It can be seen that the antennae 31, 32 will thus be energized cyclically in sinusoidal fashion at a frequency depending upon the frequency of source 43. By adjustment of the grid bias of tubes 40, 41 the overlap of the signal energy transmitted may be reduced to a tolerable amount or entirely eliminated. This frequency should be considerably lower than the radio frequency 44 used for signalling but is preferably well above the frequency to be used for signalling. The energy conveyed to antennae 31, 32 may then be modulated by any known means, either in the feed lines or in any other way, if desired.

In Fig. 5 is illustrated a radio beacon of the signal comparison type for runway localizer or course guiding purposes utilizing an antenna array in accordance with my invention. By using vertically displaced alternatively keyed antenna, the cone of silence over the beacon may be made of definite position, so the beacon may serve also as a marker beacon. It is clear that although I have shown vertical dipoles in the circuits of Figs. 2 and 3, the invention is not limited to this type of antenna and any arrangement providing either vertical or horizontal polarization may be used with beneficial results.

In Fig. 5 I have provided two antenna arrays comprising antennae 51, 52, 51′, 52′, respectively, each of which array is designed in accordance with the teachings of Fig. 2 to avoid the multiple lobe effect. These antennae are energized from a common source of radio frequency energy 53, so as to transmit overlapping patterns to produce the well known beacon guiding indication. Modulating means 54, 54′ of any known type, for example, rotary condensers driven by motor 55 are provided so as to produce a distinctive modulation characteristic on each of the antenna arrays for providing the necessary signals for comparison to produce the course indication.

Although I have shown horizontal V-type antennae in Fig. 5, any type of antenna arrangements which will produce the desired course may be utilized. Since the various types of antenna arrays for this purpose are well known, I have not illustrated all of these forms. It is understood, however, that antennae with separate reflectors may be utilized or other directional arrays may also be provided in accordance with known methods of the art, without constituting a departure from my invention.

In Fig. 6 I have illustrated a radio beacon using antenna arrays of the type shown in Fig. 3 for producing the course indications. In this figure, 61, 62 form one radiating antenna behind which are provided parasitic reflecting antennae 71, 72 and antennae 61′, 62′ to form the other beam of the course, together with their parasitic reflectors 71′, 72′. Antennae 61, 61′ are connected together and are energized simultaneously from alternate keying means 64, which may, for example, be an arrangement such as illustrated in Fig. 4. Similarly, antennae 62, 62′ are connected together and energized from the alternate keying means 64. By this arrangement each of the arrays 61, 62 and 61', 62' are alternately energized so as to produce the radiation pattern free of multiple vertical nulls in accordance with my invention. The energy from these antennae is supplied from radio frequency source 65. A modulator driving means 66 is provided for driving the modulating arrangements 67, 68, associated with antennae 61 and 62, and for driving the other modulating arrangements 67', 68' associated with antennae 61', 62'. Modulating arrangements 67, 68 and 67', 68' may be given distinctive characteristics so as to produce the desired intersecting course line.

The particular keying arrangement shown in Fig. 4 is well suited for a beacon system energized in the manner illustrated in Fig. 6. It is clear that each of the tubes 40, 41, of Fig. 4 feed two separate antenna systems, 61, 61' and 62, 62', respectively, each of which by itself will produce a guiding beacon similar to an uncorrected beacon system. The system is more reliable than other arrangements, since a guiding course will still be obtained even though one of the tubes 40 and 41 should completely fail. Furthermore, a reduction in the emissivity of either of the tubes will not cause an error in course indication since the reduction will be the same on both sides of the course.

While I have illustrated and described above a few preferred embodiments of my invention, it should be distinctly understood that these embodiments are merely by way of illustration and are not intended as a limitation of the scope of my invention. What I consider to be my invention and desire to secure protection upon is embodied in the accompanying claims.

What I claim is:

1. A radio beacon comprising a first directive antenna system having a first and a second antenna arranged vertically one above the other at predetermined heights above the earth's surface, a second directive antenna system having similarly arranged first and second antennae, said first and second antenna systems being arranged to form overlapping radiation patterns, a source of radio frequency energy, means coupling said source to said antenna systems to alternately energize said first antennae of each system and said second antennae of each system, and means for modulating the energy transmitted from each antenna system to produce distinguishing signal characteristics.

2. A radio antenna system according to claim 1, wherein said alternately energizing means comprise a source of keying frequency, a pair of vacuum tubes arranged in a circuit, means for coupling said keying frequency source to the input of said circuit in push-pull relation, means for coupling said radio frequency to the input circuit of said tubes in parallel relation, and means for coupling the plate circuits of said tubes respectively to said first and second antennae of each of said systems.

3. A radio antenna system comprising a first antenna mounted at a height above the earth's surface to produce a radiation pattern having a plurality of maxima and minima in a vertical plane, a second antenna mounted in substantially vertical alignment below said first antenna at a height to produce a radiation pattern having a plurality of maxima substantially corresponding in amplitude and position to the minima produced by said first antenna, a source of radio frequency energy, means for modulating said energy at signal frequencies to transmit a desired message, and means for alternately energizing said antennae with the resulting modulated energy at a rate substantially higher than said signal frequencies, whereby a substantially smooth resultant vertical signal modulation radiation pattern is produced, said means for alternately energizing including a source of keying frequency, a circuit comprising a pair of vacuum tubes arranged in push-pull relation, means for coupling said keying frequency source to the input of said circuit in push-pull relation, means for coupling said radio frequency source to the input circuit of said tubes in parallel relation, and means for coupling the plate circuits of said tubes respectively to said first and second antennae.

ANDREW ALFORD.